No. 873,679.
PATENTED DEC. 10, 1907.
F. O'BRIEN.
BAND BRAKE.
APPLICATION FILED DEC. 18, 1906.
2 SHEETS—SHEET 1.
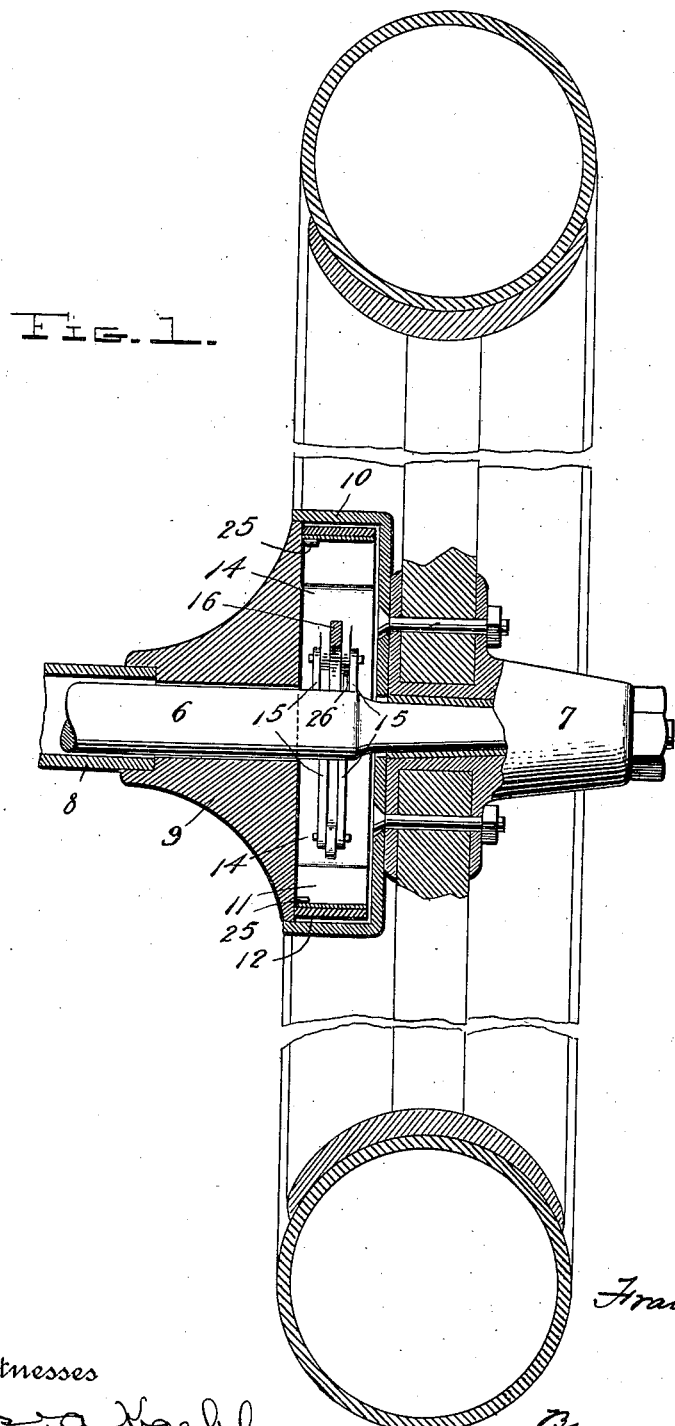

No. 873,679.
PATENTED DEC. 10, 1907.
F. O'BRIEN.
BAND BRAKE.
APPLICATION FILED DEC. 18, 1906.
2 SHEETS—SHEET 2.
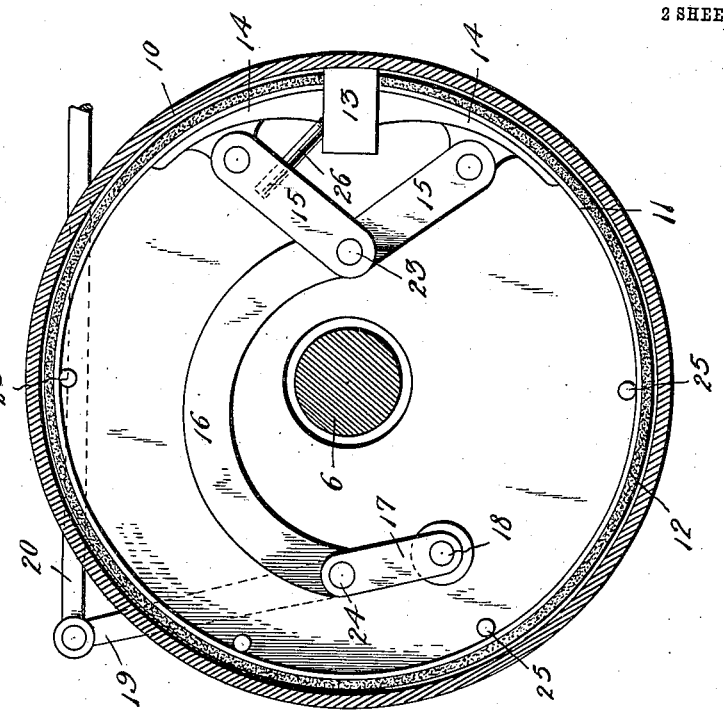
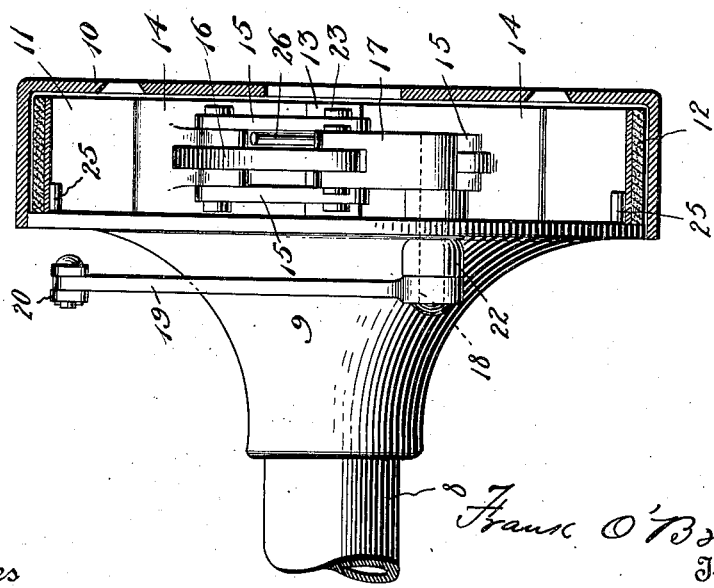
Witnesses
Frank O'Brien
Inventor
Attorney

UNITED STATES PATENT OFFICE.

FRANK O'BRIEN, OF JACKSON, MICHIGAN, ASSIGNOR TO BUICK MOTOR COMPANY, OF FLINT, MICHIGAN.

BAND-BRAKE.

No. 873,679.　　　　Specification of Letters Patent.　　　　Patented Dec. 10, 1907.

Application filed December 18, 1906. Serial No. 348,431.

*To all whom it may concern:*

Be it known that I, FRANK O'BRIEN, a citizen of the United States, residing at Jackson, in the county of Jackson and State of Michigan, have invented new and useful Improvements in Band-Brakes, of which the following is a specification.

This invention relates to band brakes particularly adapted for motor vehicles, and applies especially to the band and to the means for supporting the same in operative position with respect to the cup or ring to which it is applied or with which it coöperates.

It is common to support a one piece expanding band at one end by a stud or the like; also to support a split band by means of a stud at the middle, or midway between its ends; or, when the band is formed in two pieces, by means of a hinge pin or stud between said pieces. When such a band brake is supported or fixed at the middle, the rotation benefits or expands it at one end, but tends to contract it at the other, so that although there is an advantage on one side incident to friction there is an equal disadvantage on the other side, and consequently this form of band requires powerful operating leverage. When such a band brake is fixed or supported at one end its friction will operate to expand it in one direction, while in the opposite direction of rotation the friction will tend to contract it and thus to release it; and this is particularly disadvantageous or inconvenient in connection with automobiles, incident to the liability of backing down when the machine is brought to a stop on an upgrade, by failure of the motor or otherwise, owing to the failure of such a brake to hold.

With a one piece band, the method of attachment referred to has the defect that the band is weakened at the stud, by the constant expansion and contraction of the band incident to the operation of the brake, and furthermore, in some cases a separate arm or support is necessary to hold the stud to which the band is attached. Also, all such bands must be spaced from the cup at the stud since there is no expansion there, and consequently the whole circumference of the band cannot be applied to the cup when the brake is set. This leads to quick and unequal wear.

The present invention avoids these defects by providing a band which is not rigidly fixed or weakened at any point, but which is so supported that it will be stopped or held at either end, according to the direction of rotation, and will expand or act over its whole circumference in consequence of friction caused by rotation in either direction, relative rotation being prevented by means of a stop pin or lug which is secured to a fixed part or structure and which projects between the ends of the band; or by other equivalent means. The band, while it is nevertheless supported in operative position to act by rotation of the parts, may be said to be "floating" to the extent that it will stop and expand with equal power either way, when once engaged. Also, the entire circumference of the band is applied and is effective, since the band expands at all points, and the friction of the brake serves to increase the expansion by acting around the whole circumference, thus giving double the braking power of any of the middle supported brakes.

The invention further has the advantages of cheap construction, ease of operation, and absence of adjustment, since the throw of the lever will take up any wear, until the band is worn out. It will also operate on a machine having untrue hub cups, due to wear or other cause, since the flexible band will spring or conform to the cup.

The invention is illustrated in the accompanying drawings, in which

Figure 1 is a sectional view showing the device applied to a wheel and axle. Fig. 2 is a side elevation, with the band in section. Fig. 3 is an end or face view of the parts shown in Fig. 2.

Referring specifically to the drawings, 6 indicates an axle and 7 the hub of a wheel fixed thereto. The axle is inclosed in a tubular casing 8 which is provided at the outer end with a head 9, having a circular face extending around the axle, and which carries the band. The cup is indicated at 10, and is bolted to the hub of the wheel and the hollow part thereof is presented toward the head 9. The parts 8 and 9 are relatively fixed or stationary.

The band is indicated at 11 made of spring steel or other spring metal, with enough stiffness to hold its shape and position. The band is preferably faced with fiber or other friction material 12, and it fits within the cup so that it acts by expansion to apply the brake. The head 9 is provided with an outwardly projecting lug or stop 13 which projects between the ends of the band which is split as shown. The respective ends of the band are provided with blocks 14 connected to double toggle arms 15 which connect by means of a curved link 16 to a crank arm 17 projecting from one end of a shaft 18 the other end of which has a crank arm 19 connected by rod 20 to any suitable operating mechanism.

The toggle arms 15 are double, as shown in Fig. 2, and the shaft 18 is carried in a bearing 22 extending through the head 9. This bearing gives a stable support for the said operating shaft.

The pivotal connection 23 between the curved link 16 and toggle arms 15, and the pivotal connection 24 between said link and the crank arm 17, are opposite, or as near opposite as possible, on a diametrical line through the center of the axle. The reason for this is that when the brake is expanded and the machine stops or changes from forward to backward motion there is or tends to be a shift or movement of the link 16 and its connections, incident to the slight shift of the band and the different centers of the lever and the hub cup. This movement or jar, by the construction shown, is reduced to the minimum.

The band is hung and supported in place within the cup by means of the toggle and its connections, and also by means of a series of pins 25 which project from the head 9, within the band, and a pin 26 which projects from the lug 13 between the double toggle arms 15. This latter keeps the band in position sidewise. The band is free from rigid attachment to the head, but relative circular movement or rotation thereof is prevented by means of the stop 13 against which the ends of the band abut, and which therefore when the brake is applied prevent slip of the band in either direction, irrespective of whether the machine is running forward or backward. When the toggle is straightened by means of the crank and connection the band is expanded and applied around its whole circumference, giving a large and true friction surface, and the friction tends to further expand the band around its whole circumference, thereby giving great braking power.

I claim:

1. In a brake of the kind described, the combination of a wheel carrying a ring, an axle connected to the wheel, a tubular casing over the axle, having a circular head at the end fitting at its edge close to the ring, with a series of pins and a stop projecting into the ring, a split band supported upon the pins, with its ends arranged to abut the stop, and means to expand the band.

2. In a brake of the kind described, the combination of a wheel carrying a ring, an axle connected to the wheel, a tubular casing over the axle, having a stop projecting into the ring, a split band supported within the ring with its ends arranged to abut the stop, double toggle arms connected to the opposite ends of the band and having means to expand the same, and a pin projecting from the stop and between the toggle arms, to prevent lateral movement of said arms and band.

3. In an expanding band brake, in combination, an axle, a wheel thereon carrying a friction ring, a split brake band within the ring, toggle arms connected to opposite ends of the ring, an operating lever moving in a plane parallel to that of the band, and a bent link extending around the axle and pivotally connected at one end to the toggle arms and at the other to the lever, the respective connections being substantially diametrically opposite, and the axes of the pivots being parallel.

In testimony whereof I have signed my name to this specification in the presence of two subscribing witnesses.

FRANK O'BRIEN.

Witnesses:
ELIZABETH J. PRICE,
JESSIE A. GORDON.